US010170137B2

(12) United States Patent
Bastian et al.

(10) Patent No.: US 10,170,137 B2
(45) Date of Patent: Jan. 1, 2019

(54) VOICE SIGNAL COMPONENT FORECASTER

(71) Applicant: INTERNATIONAL BUSINESS MACHINES CORPORATION, Armonk, NY (US)

(72) Inventors: David C. Bastian, Addison, IL (US); Aaron K. Baughman, Silver Spring, MD (US); Nicholas A. McCrory, Sacramento, CA (US); Todd R. Whitman, Bethany, CT (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/598,635

(22) Filed: May 18, 2017

(65) Prior Publication Data

US 2018/0336919 A1 Nov. 22, 2018

(51) Int. Cl.
| | |
|---|---|
| G10L 21/02 | (2013.01) |
| G10L 25/84 | (2013.01) |
| G10L 21/0232 | (2013.01) |
| G10L 15/26 | (2006.01) |
| G10L 15/22 | (2006.01) |
| G10L 21/0208 | (2013.01) |

(Continued)

(52) U.S. Cl.
CPC .............. *G10L 25/84* (2013.01); *G10L 15/22* (2013.01); *G10L 15/26* (2013.01); *G10L 21/0208* (2013.01); *G10L 21/0232* (2013.01); *G10L 15/02* (2013.01); *G10L 15/20* (2013.01); *G10L 17/02* (2013.01); *G10L 2015/223* (2013.01); *G10L 2021/02087* (2013.01)

(58) Field of Classification Search
CPC combination set(s) only.
See application file for complete search history.

(56) References Cited

U.S. PATENT DOCUMENTS

| 9,373,339 B2 | 6/2016 | Thyssen et al. |
|---|---|---|
| 2009/0287624 A1 | 11/2009 | Rouat et al. |
| 2009/0287685 A1 | 11/2009 | Charnock et al. |

FOREIGN PATENT DOCUMENTS

| CA | 2501989 C | 7/2011 |
|---|---|---|
| GB | 2536727 A | 9/2016 |

OTHER PUBLICATIONS

Peter Mell et al, The NIST Definition of Cloud Computing, National Institute of Standards and Technology, Publication 800-145, 2011.

(Continued)

*Primary Examiner* — Vu B Hang

(74) *Attorney, Agent, or Firm* — Patrick J. Daugherty; Daugherty & Del Zoppo Co., LPA

(57) ABSTRACT

Aspects forecast voice signal components, wherein processors are configured to translate the audio data that includes voice data and a fabricated background noise into frequency domain data; identify a threshold number of top frequencies within the frequency domain data; and generates a hash code value from the threshold number of top frequencies. In response to determining that the generated hash code value is unique from other hash code values that are indexed to each of a unique identification of the speaker and a background noise profile identification of the fabricated background noise, the processor indexes a model of the threshold number of top frequencies in association with the hash code to the speaker identification and to the background noise profile.

14 Claims, 5 Drawing Sheets

(51) Int. Cl.
      *G10L 15/20*     (2006.01)
      *G10L 17/02*     (2013.01)
      *G10L 15/02*     (2006.01)

(56)           References Cited

OTHER PUBLICATIONS

Thomas Voice, A Global Stability Result for Primal-Dual Congestion Control Agorithms with Routing, ACM SIGCOMM Computer Communications Review, vol. 34, No. 3, 2004.

Melvin Fitting, Logic Programming Semantics Using a Compact Data Structure, Proceedings of the ACM SIGART International Symposium on Methodologies for Intelligent Systems, ISMIS, 1986.

VOICE SIGNAL COMPONENT FORECASTER

BACKGROUND

Users of smart phones and other mobile programming devices may dictate commands and other text content into device microphones, wherein the device (or service in communication with the utilized device) applies speech-to-text processing to the spoken content to transform the speech content into text content for processing (for example, to determine a command to respond to, or to generate a text message from the spoken content, etc.). However, background noise may interfere with consistently receiving and processing the spoken content, resulting in failure of the devices to accurately receive and transform all of the spoken content. This problem is exacerbated when the relative volumes, types and tonal qualities of the background noise vary over time, which is common with respect to mobile usage in crowded or urban environments.

The "cocktail party effect" refers to the ability of a listener to selectively focus on and comprehend the speech content conveyed by a single speaker within a noisy environment that presents a wide variety of competing sound inputs, sometimes including speech inputs from other different speakers. Environments presenting cocktail party effect challenges from sound inputs that include many people speaking simultaneously include meeting rooms, classrooms, mass assembly venues presenting sporting events or musical performances, coffee shops and restaurants, bars, etc. Cocktail party effect challenges may also be presented by environments that present background noise sounds, levels and profiles that vary over time, such as within a moving automobile passing through a variety of different environments.

Through selectively applying a variety of compensating techniques to focus upon a single speaker within noisy environments, generally referred to as the "cocktail party effect," a listener is enabled to focus on and comprehend the speech content of one speaker, to "tune into" a single voice and "tune out" all other voices, music inputs, etc. Further, listeners are also able to simultaneously monitor the tuned-out content to immediately detect words of importance originating from said tuned-out or unattended other voices or stimuli, for instance hearing one's name in another conversation or as broadcast over an audio speaker that the listener was not focusing upon.

Cocktail party effect abilities rely upon a complex combination of human cognitive abilities, and vary as a function of age, wherein the ability to filter out unattended stimuli reaches its prime in young adulthood, and then diminishes with further aging. Older adults generally have a harder time than younger adults focusing in on one conversation if competing stimuli, like "subjectively" important messages, are included in background noise stimuli.

SUMMARY

In one aspect of the present invention, a computerized method for a voice signal component forecaster includes executing steps on a computer processor. Thus, a computer processor is configured to acquire audio data that includes voice data and a fabricated background noise, wherein the voice data is spoken by a speaker to a listener within an aural environment of the speaker and the listener, and the fabricated background noise replicates a profile of background noise of a known noisy environment. The processor further translates the acquired audio data into frequency domain data; identifies a threshold number of top frequencies within the frequency domain data; and generates a first hash code value from the threshold number of top frequencies of the frequency domain data. In response to determining that the generated hash code value is unique from other hash code values that are indexed to each of a unique identification of the speaker and a background noise profile identification of the fabricated background noise, the processor indexes a model of the threshold number of top frequencies in association with the first hash code to the speaker identification and to the background noise profile.

In another aspect, a system has a hardware processor in circuit communication with a computer readable memory and a computer-readable storage medium having program instructions stored thereon. The processor executes the program instructions stored on the computer-readable storage medium via the computer readable memory and is thereby configured to acquire audio data that includes voice data and a fabricated background noise, wherein the voice data is spoken by a speaker to a listener within an aural environment of the speaker and the listener, and the fabricated background noise replicates a profile of background noise of a known noisy environment. The processor further translates the acquired audio data into frequency domain data; identifies a threshold number of top frequencies within the frequency domain data; and generates a first hash code value from the threshold number of top frequencies of the frequency domain data. In response to determining that the generated hash code value is unique from other hash code values that are indexed to each of a unique identification of the speaker and a background noise profile identification of the fabricated background noise, the processor indexes a model of the threshold number of top frequencies in association with the first hash code to the speaker identification and to the background noise profile.

In another aspect, a computer program product for a voice signal component forecaster has a computer-readable storage medium with computer readable program code embodied therewith. The computer readable hardware medium is not a transitory signal per se. The computer readable program code includes instructions for execution which cause the processor to acquire audio data that includes voice data and a fabricated background noise, wherein the voice data is spoken by a speaker to a listener within an aural environment of the speaker and the listener, and the fabricated background noise replicates a profile of background noise of a known noisy environment. The processor further translates the acquired audio data into frequency domain data; identifies a threshold number of top frequencies within the frequency domain data; and generates a first hash code value from the threshold number of top frequencies of the frequency domain data. In response to determining that the generated hash code value is unique from other hash code values that are indexed to each of a unique identification of the speaker and a background noise profile identification of the fabricated background noise, the processor indexes a model of the threshold number of top frequencies in association with the first hash code to the speaker identification and to the background noise profile.

BRIEF DESCRIPTION OF THE DRAWINGS

These and other features of embodiments of the present invention will be more readily understood from the following detailed description of the various aspects of the invention taken in conjunction with the accompanying drawings in which.

DETAILED DESCRIPTION

Figure 1:
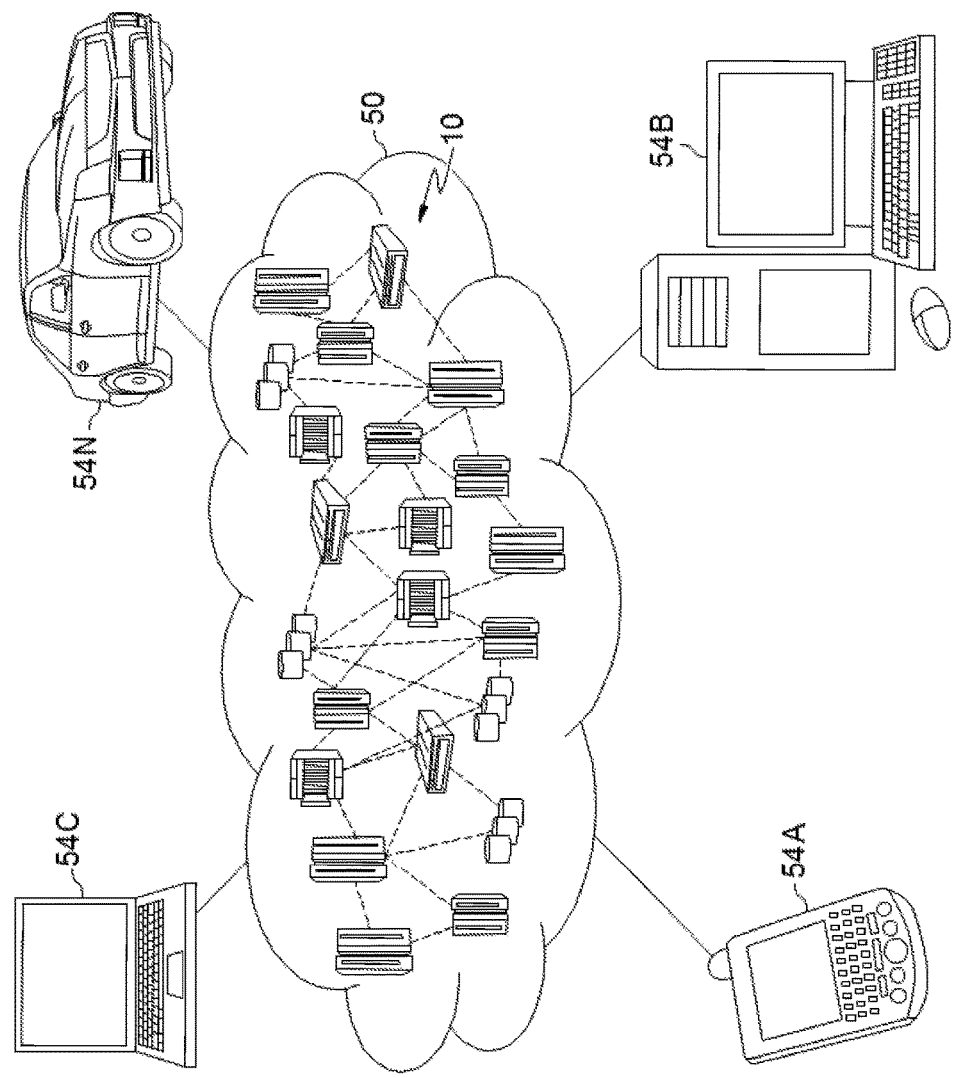
FIG. 1 depicts a cloud computing environment according to an embodiment of the present invention.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
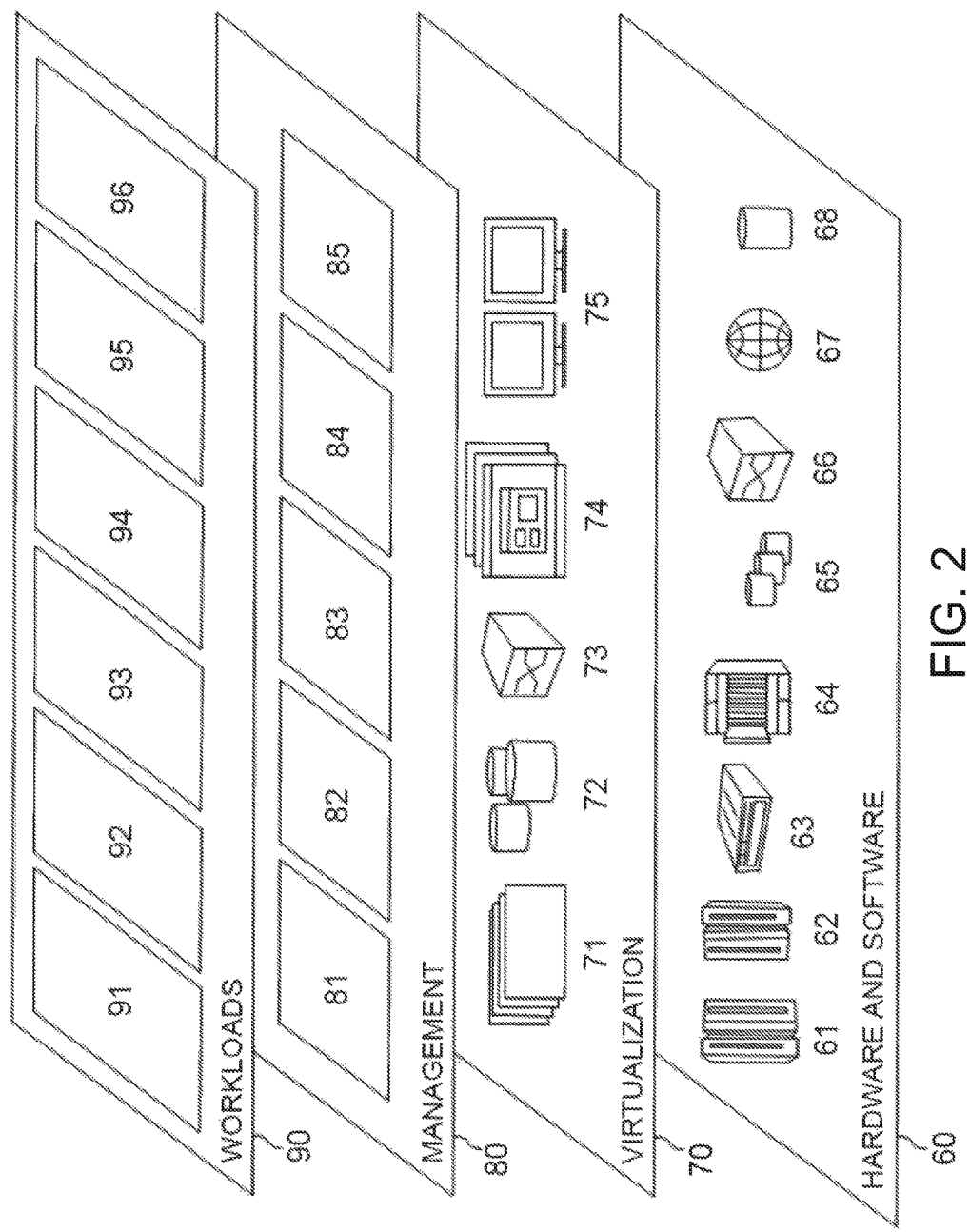
FIG. 2 depicts abstraction model layers according to an embodiment of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and processing for a voice signal component forecaster 96.

Figure 3:
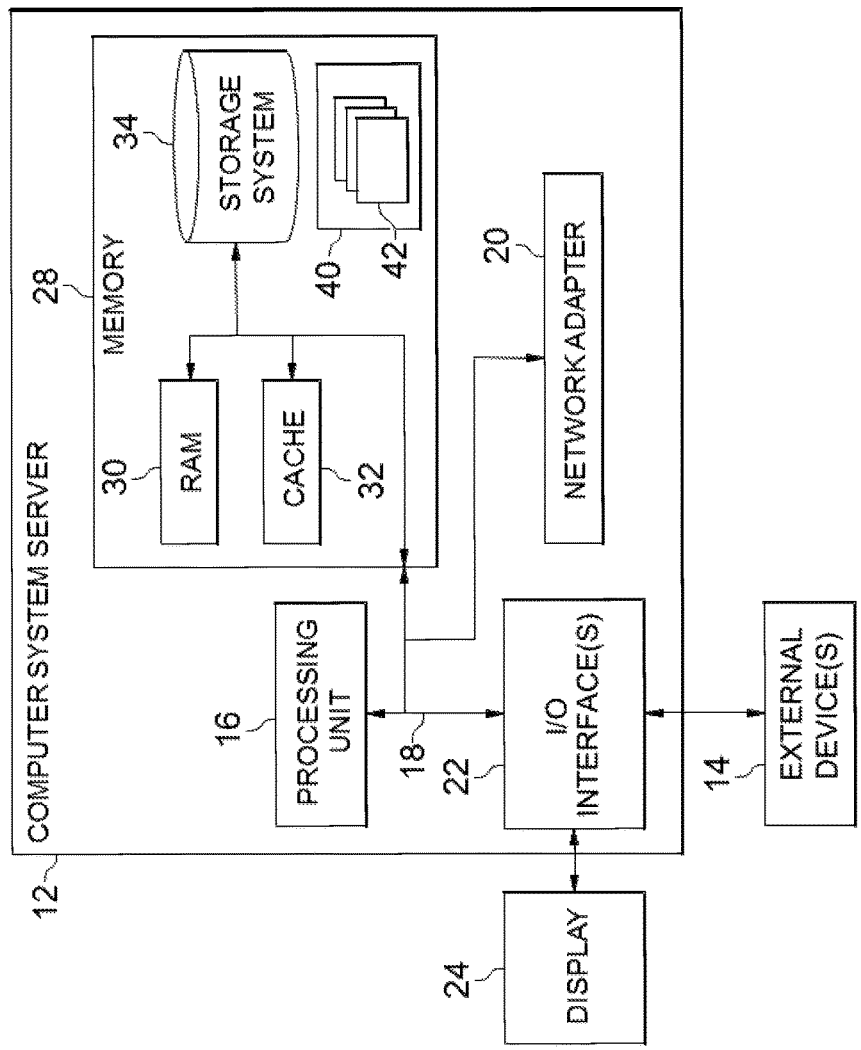
FIG. 3 depicts a computerized aspect according to an embodiment of the present invention.

FIG. 3 is a schematic of an example of a programmable device implementation 10 according to an aspect of the present invention, which may function as a cloud computing node within the cloud computing environment of FIG. 2. Programmable device implementation 10 is only one example of a suitable implementation and is not intended to suggest any limitation as to the scope of use or functionality of embodiments of the invention described herein. Regardless, programmable device implementation 10 is capable of being implemented and/or performing any of the functionality set forth hereinabove.

A computer system/server 12 is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

The computer system/server 12 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Configuring programmable devices to replicate cocktail party effect abilities in focusing upon, isolating and comprehending spoken text content from a given speaker within a noisy environment is problematic. Some filter model approaches to replicating cocktail party effects assume a listener (or a programmable device acquiring auditory data through a microphone) dynamically selects between different filter mechanisms to block out unselected auditory information that varies in nature during the acquisition of speech data from a particular source, one that is being "focused upon" to the exclusion of other auditory signal sources. One filter model hypothesizes that as information enters the human brain through sensory organs (the ears) it is stored in sensory memory, wherein the person or device dynamically selects and applies filter mechanisms so that only selections or amounts of focused-upon or attended information pass through a buffer memory system hosting an incoming stream of information, the amounts of sufficient quantity and time duration so that the person or device may pay attention to the source and the embedded information, so that the information may be processed further for comprehension.

Prior art filter models generally assume that persons pass selected attention is then passed into working memory, a set of mechanisms that underlie short-term memory and communicate with long-term memory, wherein auditory information can be selectively attended to on the basis of its physical characteristics, such as location and volume. However, filter models generally fail to account for the observation that people have the ability to simultaneously attend to words of semantic importance (for example the individual's own name) received from other unattended, and thus "filtered-out," channels, while otherwise focusing on a particular speaker.

Successfully focusing upon and comprehending the speech content of one speaker in a crowded room via the use of cocktail party effect abilities may be dependent in part upon a speech profile utilized by the speaker, such as defined by level volume, tone, pitch, cadence or word rate, etc. Speakers may use feedback signals conveyed by listeners, or by automated speech-to-text devices, in a crowded, noisy environment to modulate their speech data signal profiles until they receive positive feedback indicating that the listener or automated speech-to-text device has comprehended the speech content. Thus, the speaker may repeat a phrase in a different speech profile that has a different level of one or more of volume, tone, pitch, cadence or word rate, etc., relative to a previous speech presentation, in some cases iteratively, until the speaker receives a positive feedback indication from the listener that the listener comprehended the phrase speech content (for example, by nodding or conveying an expression indicative of comprehension, or asking a follow-up question, etc.), or indication that an automated speech-to-text device has accurately transcribed the speech content. Automated device aspects of the present invention utilize such speaker tendencies to identify and predict (forecast) different possible speech profile attributes that a particular speaker will select and utilize as a function of time in a particular noisy environment, as a function of historic speech profile selections and presentations by the speaker within similar or analogous noisy environments. The forecasted speech profile attributes are used to optimize the selection of specific frequency bands of the speaker's speech content signal data to maximize clarity in reproduction of the speech content, or accuracy in speech-to-text transformation outputs (via application of frequency-specific filters and signal amplifiers, etc.).

Figure 4:
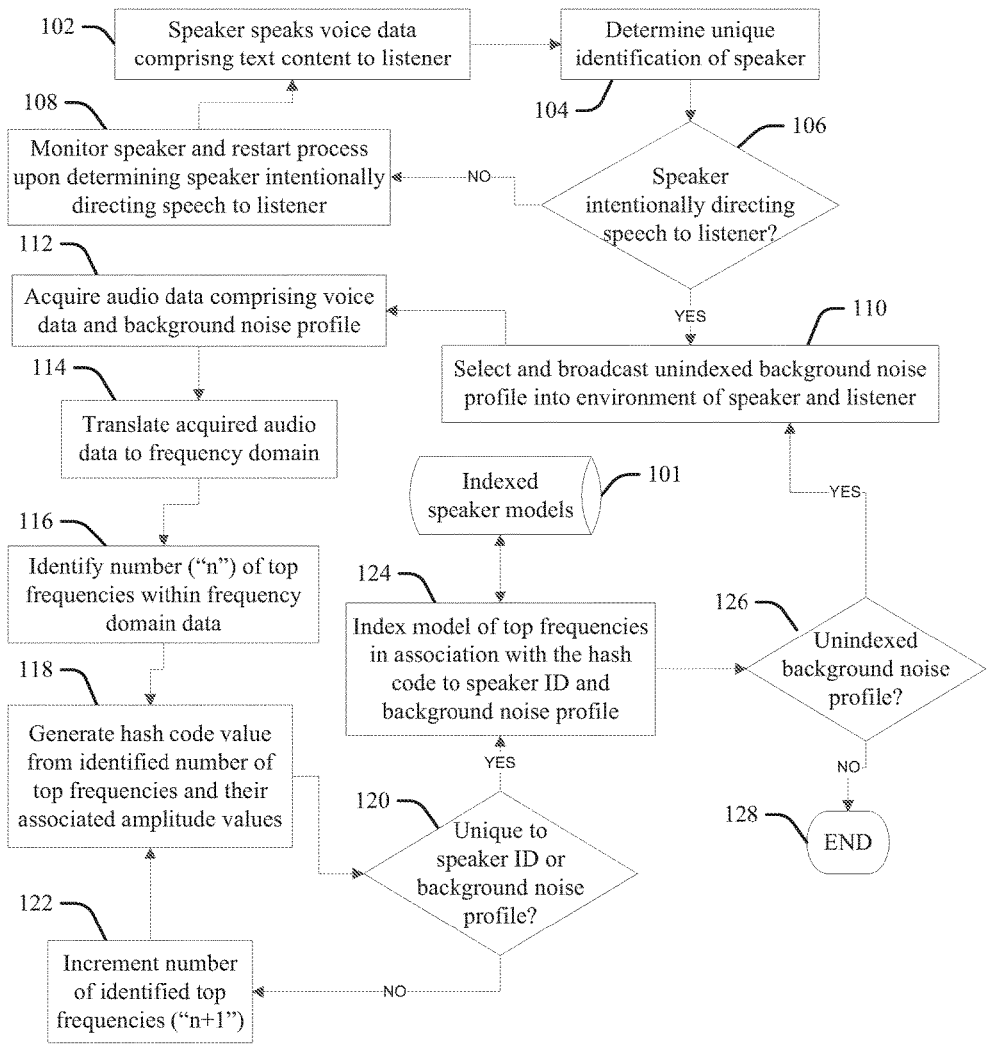
FIG. 4 is a flow chart illustration of an aspect of the present invention.

FIG. 4 illustrates a process or system for training a voice signal component forecaster according to the present invention. At 102 a unique speaker speaks (projects auditory signal) voice data having text content to a listener. For example, the speaker addresses another person as listener within a room, or addresses a programmable device executing a speech-to-text application that transforms spoken content into text content to recognize defined commands, or transcribe dictated speech content, etc.

At 104 a processor that is configured according to an aspect of the present invention (the "configured processor") determines a unique identifier (indicia of identification) for the speaker (for example, name, unique organization title, employee or student number, etc.).

At 106 the configured processor determines whether the speaker is engaged in speaking directly to the listener, thereby directing the voice data speech content to the listener with the intention that the listener may comprehend the spoken text content. Aspects may measure or otherwise determine a level of engagement value and compare to a threshold value to verify that the speaker is actively and intentionally trying to be understood by the listener by addressing the spoken content to the listener, rather than addressing text contents to another listener; or to no listener in particular, such as broadcasting general exclamations to a room full of people, or to more than one person or device, without intending that any one listener in particular comprehends the spoken content. The configured processor may use a variety of means, processes, values and thresholds to determine whether the speaker is engaged in intentionally speaking directly to the listener at 106, including processing camera image data to determine whether the body language or eye direction of the speaker is focused on or prioritizes attention on the listener relative to other present listeners (for example, within a threshold direction variance or certainty or percentage of time), using directional microphone data to determine whether the speaker is consistently directing the speech content at the same listener, staying within a threshold distance of the listener (so that the listener is close enough to hear the speech at current volume levels, or hear the speaker over competing sound stimuli), and still other techniques and processes will be apparent to one skilled in the art.

In response to determining at 106 that the speaker is not engaged in speaking directly to the listener, at 108 the configured processor transitions to a listening state to monitor the speech output of the speaker, until determining that the speaker is intentionally directing speech to this or another listener, wherein the configured processor returns to process or step 102.

Otherwise, in response to determining (or confirming) at 106 that the speaker is engaged in speaking directly to the listener, at 110 the configured processor selects a background noise profile that is not already indexed to the unique speaker identification and broadcasts the selected background noise profile into the aural environment of the speaker and listener (for example, into a common room, or projected by audio speakers at the speaker and listener, etc.) to thereby compete with the spoken content of the speaker in acquisition of sound signals by the listener. In confirming the attention (intent) of the speaker at 106 the configured processor confirms that a current voice profile selected and utilized by the speaker to speak to the listener is useful for training, as likely selected by the speaker with the intention to be understood in the current noisy environment created by presentation of the selected background noise, and thus that the selected voice profile is likely to be used by the speaker again in the future in order to be understood by this listener or another listener when the speaker is presented with the same or analogous background noises.

The background noise profile selected and broadcast at 110 is generally a fabricated noise profile that is created to represent a common or typical noisy environment that the speaker will likely experience in the real world. Illustrative but not limiting or exhaustive examples include recorded environmental sounds or generated replications thereof of a plurality of other voices (including as speaking in a crowded room), and environmental sound exposures encountered while in a moving automobile, bus, airplane or other transportation vehicle, or exposed to the listener from a surrounding natural environment (a loud surf sound, high winds, rainstorms, etc.), and still other appropriate examples will be apparent to one skilled in the art). The "unindexed" state of the profile is a prerequisite for selection, wherein an "indexed" state of a potentially selectable background noise profile indicates that the profile has already been selected and indexed to the speaker ID pursuant to further processes described below.

At 112 the configured processor acquires speech audio signal data including the speech of the speaker to the listener within an overall audio context of the selected background profile noise. The speech signal data represents the speaker's voice as modulated by the speaker in an effort to be heard and understood by the listener over the background noise, which may reflect one or more specific volume level, pitch, tone and/or level of sharpness values that the speaker selects as appropriate to the speaker's voice in helping the listener comprehend the spoken text content against a context established by the selected background noise profile.

At 114 the configured processor translates the acquired audio data from its current form (an analog or time-based domain) to the frequency domain to generate a frequency domain data profile (or representation) of the acquired speech signal. For example, some aspects apply a fast Fourier transform ("FFT") process to the analog speech signal data, and still other techniques will be apparent to one skilled in the art.

At 116 the configured processor identifies a threshold number ("n") of top frequencies within the frequency domain profile, for example, the top three where n is initialized to a minimum threshold value of three (3). The initial threshold value may be any number selected as likely to provide a sufficient number of top frequency values in order to distinguish other indexed values for this identified speaker. The number of frequency partitions may be selected to define a minimum step size that available computing power resources or cost limitations are able to accommodate, wherein the lower the step size, the better the results.

At 118 the configured processor generates a hash code value from the frequencies of the identified top number of frequencies. In some aspects, the hash values are generated from the top frequency values and their associated amplitude values, and still other examples will be apparent to one skilled in the art.

At 120 the configured processor compares the generated hash code value to other hash code values indexed to the speaker identification and the background noise profile (or to some other minimal unique value threshold, where no other values are yet indexed to the speaker ID or the background noise profile) in order to confirm that the generated hash code is unique from any other hash code value indexed to the speaker ID and the selected background noise profile (or that it is likely unique if no other hash values are yet indexed to the speaker ID or to the selected background noise profile).

In response to determining at 120 that the generated hash code value is not (likely) unique to other hash code values indexed to the speaker identification or to the selected background noise profile, at 122 the configured processor increments the number of top frequencies used to generate the hash value and iteratively repeats the processes of 118 and 120, until determined that a current iteration of the generated hash value is (likely) unique relative to any other hash values indexed to the speaker and the background noise profile. Thus, the configured processor determines at 120 whether the hash value is unique relative to any other hash values indexed to this speaker with respect to other, different background noise profiles, or to any other hash values indexed to this background noise profile with respect to other, different (unique) speakers.

Each iteration of the processes at 118-120 may occur during a current conversation. In some aspects the speech signal may not generate a sufficient number of top frequencies (or of top frequency and amplitude values) in order to generate a (likely) unique hash code value, wherein the speaker is signaled with feedback to alter their speech signal to the listener in the context of the currently-selected and broadcast background profile (for example, requesting that the speaker attempt to speak more clearly, loudly, slowly, etc.) until a sufficient number of top frequencies are identified in order to generate a unique hash code.

In response to determining at 120 that a current iteration of the generated hash value is (likely) unique relative to any other hash values indexed to the speaker and the background noise profile, at 124 the configured processor indexes a model of the threshold number of top frequencies in association with the generated hash code to the speaker ID and background noise profile within an indexed speaker model database or other storage repository 101.

At 126 the configured processor determines whether any other different background noise profiles remain unindexed to the speaker. If other, different background noise profiles remain unindexed to the speaker at 126, then the configured processor returns to the process or step 110 to select another of unindexed background noise profiles and broadcast into the environment of speaker and listener, to thereby ultimately index another, unique hash value generated from another set of top frequencies of the acquired speech signal from the speaker with respect to the newly selected background noise profile at 124. The training process ends at 128 once each of the different background noise profiles has been indexed to the speaker via their respective generated hash codes.

Thus, during a given conversation between the speaker and listener (device) the configured processor may iteratively select and broadcast a variety of different background noise profiles (fabricating noisy rooms with lots of other speakers, noisy automobile or airplane environments, etc.), and determine unique frequency profiles representing different tones of voice, volume, pitch, amplitude, etc., that the speaker chooses (or tends to choose) in order to be heard by the listener within each environment. By requiring that the hash values generated in response to each background profile broadcast are unique relative to each other, the configured processor identifies unique vocal tendencies of the speaker within each of the background noise environments.

Figure 5:
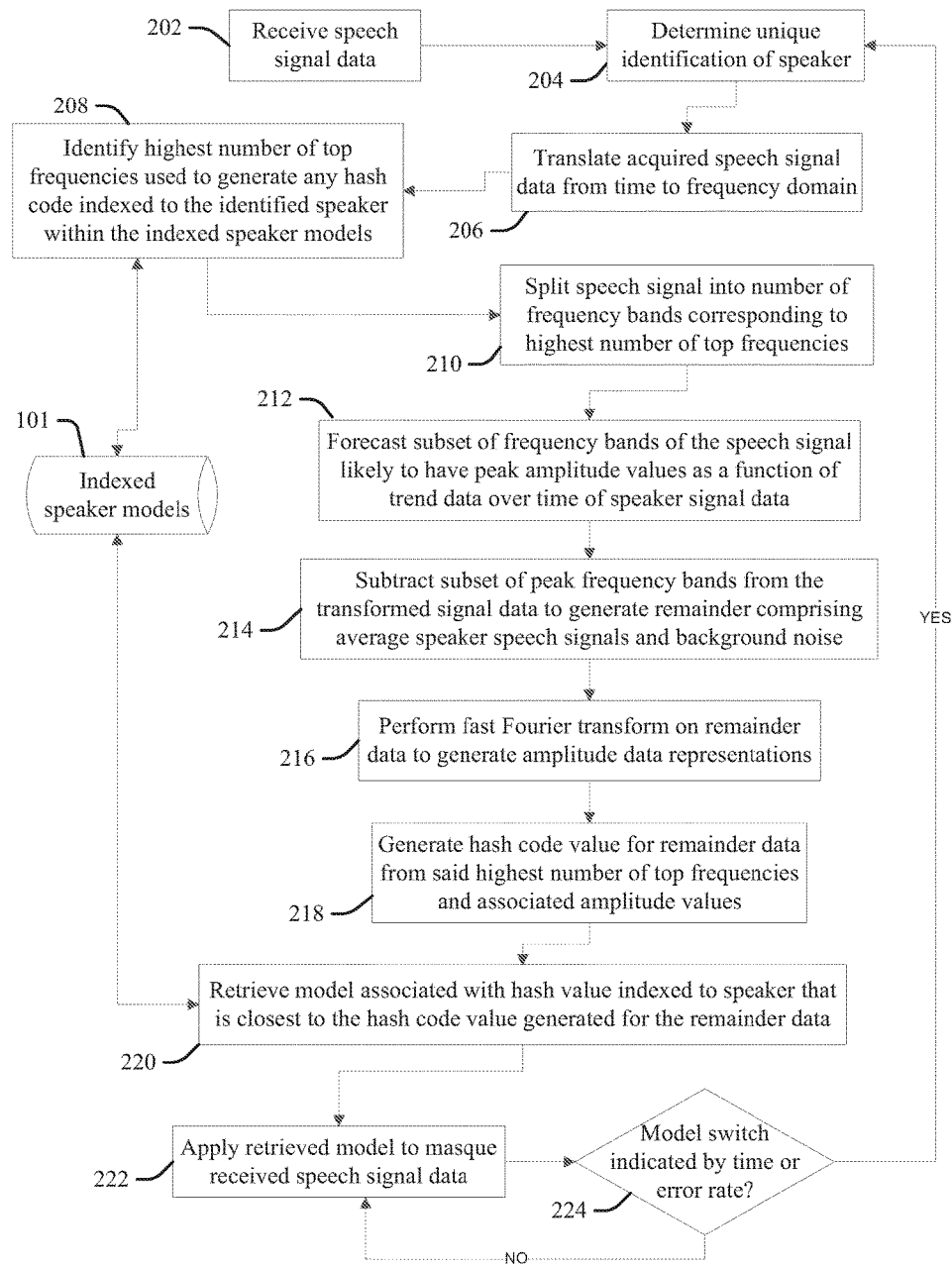
FIG. 5 is a flow chart illustration of another aspect of the present invention.

FIG. 5 illustrates a process or system for applying a trained voice signal component forecaster according to the present invention. In response to receiving at 202 speech signal data that includes speech signals from a speaker, as well as background noise, at 204 a processor that is configured according to an aspect of the present invention (the "configured processor") determines a unique identification of a speaker generating the speech signal and that is indexed to models with the index structure data 101 trained via the process of FIG. 4.

At 206 the configured processor translates the received speech signal data from time domain data to frequency domain data, and at 208 identifies a highest number of top frequencies used to generate any hash code indexed to the identified speaker within the indexed speaker models 101.

At 210 the configured processor splits the speech signal frequency domain data into a total number of frequency bands that corresponds to the highest number of top frequencies identified at 208 as used generate the hash codes indexed to the identified speaker within the indexed speaker models 101. Thus, the speech signal is split into portions that are as least as big as the smallest frequency bands used to train the indexed models of FIG. 4. In some aspects the frequency bands are equivalent in size, though other, differing band sizes may be practiced.

At 212 the configured processor forecasts (predicts) a subset of the frequency bands of the speech signal that are likely to have peak (threshold) amplitude values indicating audio speech data as a function of trends data over time of speaker signal data. Aspects use forecasting to predict variations in the tone, pitch, etc. (as captured by transformation into the frequency domain) that occur within a speaker's voice in real-world speech relative to speech patterns generally produced during training sessions captured in the training phase of FIG. 4. When speakers are aware that they are engaged in the training process of FIG. 4, they tend to intentionally modulate their voices to produce a consistent and clear speech delivery, one that differs from speech patterns in real life, wherein the speaker may be excited or more animated and less focused on consistent vocal qualities. Thus, in order to generate speech signal data that is closer to the speech signal data used to generate the models indexed to the speaker in the process of FIG. 4, at 214 the configured processor subtracts the subset of frequency bands having peak (highest or threshold-level) speech signal amplitude values of current observation data from future speech signal data received at 202, forecasting that these peak frequencies will continue to occur in the speech signal data acquired from this speaker. This process removes peaks of amplitude data likely to be generated by excited utterances and other random variations and in tones and volume, leaving a remainder of average speech signal data generated by the speech of the speaker, along with the background noise, which in composite is more likely to be similar to the sound data acquired from the speaker during the training phase of FIG. 4.

In some aspects the frequency bands are forecasted forward into time using polynomial forecasting, for example via applying the following expression (1):

$$y = \alpha_0 + \alpha_1 x + \alpha_1 x^2 + \alpha_2 x^2 + \alpha_3 x^3 + \ldots + \alpha_n x^n \varepsilon \quad (1)$$

wherein "y" is the future forecast time determined as a function of coefficients "$\alpha_n$" that modify respective time variables "$x_n$", and "$\varepsilon$" is a bootstrapped error or y-intercept value, and wherein the index degree "1" is linear, "2" is quadratic, "3" is cubic, "4" is the 4th order, etc. For each time variable, the polynomial generates a frequency band forecast value, and wherein the model is trained on the frequency information within each of the partitioned band levels. Thus, the process is enabled to go into the future and get predicted peak frequency bands from future time inputs.

The length of the forecast period may also be learned over time based on error rates and user feedback on the listening end. For example, if a user cannot understand or the hear the speaker well enough, or a programmable device transforming the speech signal to text cannot accurately generate text content from the speech signal, the forecasted time is decreased. Conversely, if the user can hear the speaker perfectly, or the programmable device is perfectly accurate in transforming the speech signal to text, the forecasted time period is extended.

Thus, changes over time of the frequency domain data of the transformed speech data received at 202 are used to project (predict) corresponding future changes in the received speech signal of the speaker, to thereby predict which of the bands of frequencies transformed from the analog speech signal data of the speaker will have peak values in the future. As the background noise frequency values tend to remain steady or constant over time, this process identifies attributes of the speech signals generated by the speaker that represent anomalies, such as excited utterances, laughter and other emphatic and non-verbal signals that tend to have frequency profiles more pronounced and different from speech signals generated from word content. The remainder of the speech signal data comprises the background noise along with an average signal of speech data generated by the speaker, wherein the speaker signal data is smoothed out by removing the forecasted peaks.

At 216 the configured processor performs a fast Fourier transform on the remainder data to generate amplitude data representations of the remainder data, and at 218 generates a hash code value for the remainder data from said highest number of top frequencies and their associated amplitude values. At 220 the configured processor retrieves the model from the indexed model repository 101 that is associated with a hash value indexed to the identified speaker that is closest to the hash code value generated for the remainder data, and at 222 applies the retrieved model as a masque to the received speech signal data. Thus, application of the retrieved model as a masque to the received speech signal data will remove the background noise signal data used to generate the indexed and applied model, which is most likely similar to the background noise present within the speech signal data received at 202, leaving audio data most likely to include the speakers voice data, which may be more accurately processed without interference from the removed background noise signals.

At 224 the configured processor verifies that application of the retrieved model as the masque results in receiving good, clean, filtered signal from the speech signal input (for example, that processing of the remainder data by a speech-to-text application meets an acceptable error or timing rate standard), and if so continues to apply the model at 222. If not, then the configured processor returns back to the process at 204 to confirm that the speaker identity is correct (or identify a new speaker), which may result is a revised indexed model selection (for the same speaker, or for another identified speaker) and application via the subsequent hash code generation and comparison processes as described above.

Aspects of the present invention allow a user to speak normally while in a noisy environment, while at the same time enabling applications executing the processes of FIGS. 4 and 5 on a programmable device of the user (mobile phone, tablet, laptop or desktop computer, etc.) to apply user-indexed models to filter the speech signals and thereby accurately determine text content within the user's voice. By forecasting voice spectral components into the future, aspects apply "cocktail party effect" model processing and masking as a function of identifying and matching modelled background noise profiles to increase variation space. Aspects select appropriate filters for application to voice data in response to observing cocktail party effect changes to speaker's voice with respect to the alteration of tones for a large variation of spectral component acquisition. By indexing forecasted voice spectral components (form fitting) with cocktail party background principle components, aspects select filter models based on cocktail party background principle components and filter noise that deviate from the learned model. Aspects further learning forecast distance based on end-user (listener) experience and feedback during training sessions.

The terminology used herein is for describing particular aspects only and is not intended to be limiting of the invention. As used herein, the singular forms "a", "an" and "the" are intended to include the plural forms as well, unless the context clearly indicates otherwise. It will be further understood that the terms "include" and "including" when used in this specification specify the presence of stated features, integers, steps, operations, elements, and/or components, but do not preclude the presence or addition of one or more other features, integers, steps, operations, elements, components, and/or groups thereof. Certain examples and elements described in the present specification, including in the claims, and as illustrated in the figures, may be distinguished, or otherwise identified from others by unique adjectives (e.g. a "first" element distinguished from another "second" or "third" of a plurality of elements, a "primary" distinguished from a "secondary" one or "another" item, etc.) Such identifying adjectives are generally used to reduce confusion or uncertainty, and are not to be construed to limit the claims to any specific illustrated element or embodiment, or to imply any precedence, ordering or ranking of any claim elements, limitations, or process steps.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system, comprising:
   a processor;
   a computer readable memory in circuit communication with the processor; and
   a computer readable storage medium in circuit communication with the processor;
   wherein the processor executes program instructions stored on the computer-readable storage medium via the computer readable memory and thereby:
   acquires audio data that comprises voice data and a fabricated background noise, wherein the voice data is spoken by a speaker to a listener within an aural environment of the speaker and the listener, and wherein the fabricated background noise replicates a profile of background noise of a known noisy environment;
   translates the acquired audio data into frequency domain data;
   identifies a threshold number of top frequencies within the frequency domain data wherein a minimum value of the threshold number is three;
   generates a first hash code value from the threshold number of top frequencies of the frequency domain data;
   in response to determining that the generated hash code value is unique from other hash code values that are indexed to each of a unique identification of the speaker and a background noise profile identification of the fabricated background noise, indexes a model of the threshold number of top frequencies in association with the first hash code to the speaker identification and to the background noise profile; and
   applies a first model of top frequencies that is associated with the first hash code value as a masque to the frequency domain data to remove background noise signal data from the frequency domain data.

2. The system of claim 1, wherein the processor executes the program instructions stored on the computer-readable storage medium via the computer readable memory and thereby further:
   in response to determining that the generated hash code value is not unique from an other hash code value that is indexed to one of the speaker identification and the background noise profile:
   iteratively increments the threshold number of top frequencies within the frequency domain data and generates revised hash code values from the incremented threshold number of top frequencies of the frequency domain data until a last revised hash code value is unique from the other hash code value; and
   indexes a model of the incremented threshold number of top frequencies in association the last revised hash code value to the speaker identification and to the background noise profile.

3. The system of claim 1, wherein the processor executes the program instructions stored on the computer-readable storage medium via the computer readable memory and thereby further:
   splits speech signal frequency domain data generated from audio data received from the speaker into a total number of frequency bands that corresponds to the threshold number of top frequencies;

subtracts a subset of the frequency bands of the speech signal that meet a peak threshold amplitude value from the speech signal frequency domain data to generate remainder speech signal frequency domain data;

generates a remainder hash code value from the remainder speech signal frequency domain data;

selects a one of a plurality of generated hash codes that has a value that is closest to the remainder hash code value relative to remaining others of the plurality of generated hash codes, wherein the plurality of generated hash codes comprises the first hash value, and wherein each of the plurality of generated hash codes are indexed to the unique identification of the speaker and to different ones of a plurality of background noise profiles; and applies a model of top frequencies associated with the selected hash code value as a masque to the speech signal frequency domain data.

4. The system of claim 3, wherein the processor executes the program instructions stored on the computer-readable storage medium via the computer readable memory and thereby generates the hash code value from the threshold number of top frequencies of the frequency domain data as a function of amplitude values associated with each of the threshold number of top frequencies.

5. The system of claim 1, wherein the processor executes the program instructions stored on the computer-readable storage medium via the computer readable memory and thereby identifies said subset of the frequency bands of the speech signal by projecting peak value determinations into a time in the future that is selected as a function of polynomial forecasting.

6. The system of claim 4, wherein the profile of background noise of the known noisy environment is selected from the group consisting of a plurality of other voices speaking, background noises present within a moving transportation vehicle, and environmental sound exposures from a surrounding environment.

7. A computer program product for a voice signal component forecaster, the computer program product comprising:

a computer readable storage medium having computer readable program code embodied therewith, wherein the computer readable storage medium is not a transitory signal per se, the computer readable program code comprising instructions for execution by a processor that cause the processor to:

acquire audio data that comprises voice data and a fabricated background noise, wherein the voice data is spoken by a speaker to a listener within an aural environment of the speaker and the listener, and wherein the fabricated background noise replicates a profile of background noise of a known noisy environment;

translate the acquired audio data into frequency domain data;

identify a threshold number of top frequencies within the frequency domain data, wherein a minimum value of the threshold number is three;

generate a first hash code value from the threshold number of top frequencies of the frequency domain data;

in response to determining that the generated hash code value is unique from other hash code values that are indexed to each of a unique identification of the speaker and a background noise profile identification of the fabricated background noise, index a model of the threshold number of top frequencies in association with the first hash code to the speaker identification and to the background noise profile; and apply a first model of top frequencies that is associated with the first hash code value as a masque to the frequency domain data to remove background noise signal data from the frequency domain data.

8. The computer program product of claim 7, wherein the computer readable program code instructions for execution by the processor further cause the processor to, in response to determining that the generated hash code value is not unique from an other hash code value that is indexed to one of the speaker identification and the background noise profile:

iteratively increment the threshold number of top frequencies within the frequency domain data and generates revised hash code values from the incremented threshold number of top frequencies of the frequency domain data until a last revised hash code value is unique from the other hash code value; and index a model of the incremented threshold number of top frequencies in association the last revised hash code value to the speaker identification and to the background noise profile.

9. The computer program product of claim 7, wherein the computer readable program code instructions for execution by the processor further cause the processor to:

split speech signal frequency domain data generated from audio data received from the speaker into a total number of frequency bands that corresponds to the threshold number of top frequencies;

subtract a subset of the frequency bands of the speech signal that meet a peak threshold amplitude value from the speech signal frequency domain data to generate remainder speech signal frequency domain data;

generate a remainder hash code value from the remainder speech signal frequency domain data;

select a one of a plurality of generated hash codes that has a value that is closest to the remainder hash code value relative to remaining others of the plurality of generated hash codes, wherein the plurality of generated hash codes comprises the first hash code value, and wherein each of the plurality of generated hash codes are indexed to the unique identification of the speaker and to different ones of a plurality of background noise profiles; and apply a model of top frequencies associated with the selected hash code value as a masque to the speech signal frequency domain data.

10. The computer program product of claim 9, wherein the computer readable program code instructions for execution by the processor further cause the processor to generate the hash code value from the threshold number of top frequencies of the frequency domain data as a function of amplitude values associated with each of the threshold number of top frequencies.

11. The computer program product of claim 7, wherein the computer readable program code instructions for execution by the processor further cause the processor to identify said subset of the frequency bands of the speech signal by projecting peak value determinations into a time in the future that is selected as a function of polynomial forecasting.

12. The computer program product of claim 10, wherein the profile of background noise of the known noisy environment is selected from the group consisting of a plurality of other voices speaking, background noises present within a moving transportation vehicle, and environmental sound exposures from a surrounding environment.

13. The system of claim 1, wherein the processor executes the program instructions stored on the computer-readable storage medium via the computer readable memory and thereby further:
identifies the subset of the frequency bands of the speech signal that meet the peak threshold amplitude value as frequency bands meeting the peak threshold amplitude value in training session speech patterns data of the speaker.

14. The computer program product of claim 7, wherein the computer readable program code instructions for execution by the processor further cause the processor to:
identify the subset of the frequency bands of the speech signal that meet the peak threshold amplitude value as frequency bands meeting the peak threshold amplitude value in training session speech patterns data of the speaker.

* * * * *